United States Patent
Rasmussen

(10) Patent No.: US 10,288,893 B2
(45) Date of Patent: May 14, 2019

(54) DEVICE HAVING A PARTIALLY REFLECTIVE COVER

(71) Applicant: Jens Rasmussen, Ulm (DE)

(72) Inventor: Jens Rasmussen, Ulm (DE)

(73) Assignee: e.solutions GmbH (DE)

( * ) Notice: Subject to any disclaimer, the term of this patent is extended or adjusted under 35 U.S.C. 154(b) by 726 days.

(21) Appl. No.: 14/509,729

(22) Filed: Oct. 8, 2014

(65) Prior Publication Data

US 2015/0103292 A1    Apr. 16, 2015

(51) Int. Cl.
| | | |
|---|---|---|
| G02F 1/1335 | (2006.01) | |
| G02B 27/28 | (2006.01) | |
| F21V 9/14 | (2006.01) | |
| F21V 13/08 | (2006.01) | |
| G02B 5/30 | (2006.01) | |

(52) U.S. Cl.
CPC .............. *G02B 27/283* (2013.01); *F21V 9/14* (2013.01); *F21V 13/08* (2013.01); *G02B 5/3083* (2013.01); *G02B 27/286* (2013.01); *G02B 27/288* (2013.01); *G02F 1/13362* (2013.01); *G02F 1/133536* (2013.01); *G02F 2001/13355* (2013.01); *G02F 2001/133541* (2013.01)

(58) Field of Classification Search
CPC ... G02F 1/133615; G02F 2001/133607; G02F 1/133536; G02F 1/13362; G02F 2001/133541; G02F 2001/13355; G02B 27/283; G02B 27/286; G02B 27/288; G02B 5/3083; F21V 9/14; F21V 13/08
USPC ............................................................ 349/62
See application file for complete search history.

(56) References Cited

U.S. PATENT DOCUMENTS

| | | | | |
|---|---|---|---|---|
| 2003/0132713 A1* | 7/2003 | Wei | .................. | G02F 1/133555 |
| | | | | 315/169.3 |
| 2010/0225857 A1* | 9/2010 | Lu | ..................... | G02F 1/133555 |
| | | | | 349/98 |
| 2015/0009451 A1* | 1/2015 | Zhu | ..................... | G02F 1/13363 |
| | | | | 349/64 |

FOREIGN PATENT DOCUMENTS

| | | |
|---|---|---|
| DE | 88 16 888 U1 | 1/1991 |
| DE | 699 19 204 T2 | 8/2005 |
| DE | 698 33 795 T2 | 11/2006 |
| DE | 699 34 500 T2 | 9/2007 |

* cited by examiner

Primary Examiner — Nathanael R Briggs
Assistant Examiner — William D Peterson
(74) *Attorney, Agent, or Firm* — Tarolli, Sundheim, Covell & Tummino LLP

(57) ABSTRACT

A device having a partially reflective cover, in particular for use as a decorative mirror element, is described. The device comprises a light source and a cover, which is arranged in front of the light source, the cover comprising a reflective polarizer and a circular polarizer, which is arranged behind the reflective polarizer.

18 Claims, 3 Drawing Sheets

DEVICE HAVING A PARTIALLY REFLECTIVE COVER

RELATED APPLICATION

The present application claims priority from German Patent Application Serial No. 10 2013 016 807.4, which was filed 10 Oct. 2013, and which is incorporated herein in its entirety.

TECHNICAL FIELD

The present disclosure relates generally to the field of covers. It relates in particular to a device having a partially reflective cover, for example for use as a decorative mirror element.

BACKGROUND

Predominantly in the field of consumer electronics, but also, for example, in the design of motor vehicles and other devices, device surfaces are often provided with light-emitting decorative elements. Such decorative elements frequently represent a logo of the device manufacturer or decorate contours of the object to which they are attached. Both for aesthetic reasons and for the purpose of energy saving, which is a frequent requirement in particular in the case of mobile devices with a battery-based power supply, the illumination intensity of such decorative elements is generally chosen to be relatively weak. In addition, illumination often takes place only when the device is in an active operating state, which serves both to save energy in the non-operating state and to make an active state of the device recognisable.

Owing to the often weak or non-existent active illumination of the described decorative elements, it is desirable for such elements to appear visually attractive even when their own illumination is switched off and in strong ambient light. To that end, they can be provided with a partially reflective surface, which reflects a large part of the incident ambient light in the manner of a mirror but at the same time is partially transparent to the light of a light source arranged beneath the surface. The appearance of such decorative elements thus varies, in dependence on the switching status of their light source and the ambient light conditions, between a luminous and a reflecting surface.

The use of partially reflective surfaces requires a compromise between, on the one hand, a satisfactory mirror effect for strong ambient light, which prevents the light source located beneath the surface from being visible, and, on the other hand, a sufficiently high transmissivity for the light emitted by that light source during operation. The necessary reflectivity for ambient light in most cases requires high absorption of the light emitted by the light source, which is undesirable in particular in view of the energy efficiency of illuminated decorative elements in mobile devices.

It has therefore been shown that decorative elements which avoid the above-mentioned disadvantages of low reflectivity or high absorption are desirable.

SUMMARY

An improved device having a partially reflective cover is therefore to be provided.

According to a first aspect there is provided a device having a partially reflective cover. The device is, for example, suitable for use as a decorative element. The device comprises a light source and a cover, which is arranged in front of the light source, the cover comprising a reflective polarizer and a circular polarizer, which is arranged behind the reflective polarizer.

The cover can be partially transparent to light emitted by the light source. The partially reflective properties of the cover can relate in particular to light which strikes the cover from a side opposite the light source.

The reflective polarizer can be in the form of a dielectric multi-layer mirror (also called a Bragg mirror). The dielectric multi-layer mirror can predominantly reflect non-polarized light in the visible optical wavelength range and be transparent to polarized light of at least one visible wavelength. The dielectric multi-layer mirror can be so configured that it appears similar to a silver mirror in incident non-polarized white light. Alternatively, the dielectric multi-layer mirror can be so configured that it reflects light of different wavelength ranges to different degrees, so that it appears coloured in white ambient light. In addition, the dielectric multi-layer mirror can be transparent to polarized light of different visible wavelengths, for example at specific angles of incidence.

The circular polarizer can comprise a linear polarizer and a quarter-wave layer as well as an optional half-wave layer (which could also otherwise be integrated into the device). The half-wave layer can serve, for example, for phase correction in the case of optical wavelengths that do not correspond to a reference wavelength of the quarter-wave layer. The circular polarizer can be separated from components of the device that are located behind it by a gap (e.g., an air gap). Alternatively, the circular polarizer can be adhesively bonded to a component of the device that is located behind it.

The light source can comprise a light-emitting diode. In addition or as an alternative, the light source can comprise an organic light-emitting diode-, OLED-, film. The OLED film can be adhesively bonded to the circular polarizer in front of it. Alternatively, the OLED film can be arranged separated from the circular polarizer.

The device can further comprise a liquid crystal display which is arranged in front of the light source, the light of the light source that is transmitted by the liquid crystal display being polarized. By means of the liquid crystal display, parts of the light emitted by the light source can be varied independently of one another in terms of colour. Alternatively or in addition, the liquid crystal display can be controlled in a suitable manner in order, for example, to display one or more alphanumeric symbols (e.g., information text).

On a front face of the light source there can be arranged a light guide, which can serve, for example, to homogenise the light emitted by the light source over the surface. The light guide can also serve to enable the light source to be placed at a suitable distance from the cover.

The light source can emit polarized light. Polarization can take place by means of a polarization layer, for example in a liquid crystal display (optionally as part of the light source). This layer can be arranged between the light source and the cover or can be integrated into the cover. The polarization of the emitted light and the circular polarizer of the device can be so matched to one another that maximum transmission of the emitted light through the circular polarizer takes place. To that end, the emitted light can, for example, be polarized circularly by the polarization layer of the light source.

The polarizing reflector can be transparent to light that is emitted by the light source and transmitted by the circular polarizer. For example, the polarizing reflector can be transparent to more than 80% or more than 95% of the light emitted by the light source and transmitted by the circular polarizer.

The device, in particular the cover thereof, can further comprise a transparent covering layer, which is arranged in front of the reflective polarizer. For example, the transparent covering layer can comprise glass, polyethylene terephthalate, PET, polymethyl methacrylate, PMMA, or plastic. The reflective polarizer can be adhesively bonded to the rigid covering layer and/or the circular polarizer in each case by means of an adhesive layer, which in one variant brings about an advantageous adaptation of the refractive index.

The device can further comprise a non-transparent diaphragm, the non-transparent diaphragm being arranged in front of the reflective polarizer and partially covering a front face of the reflective polarizer. The diaphragm can be so configured that part of the front face of the reflective polarizer that is covered or not covered by the diaphragm has the form of a logo. In addition or alternatively, the form of a part that is covered or not covered can correspond to a symbol and/or an (optionally a set of) alphanumeric symbols, so that the light emitted and/or reflected by the device transmits this information to a viewer of the device.

According to a second aspect there is provided a light-emitting element which comprises a device of the type presented herein. The light-emitting element can be in the form of a decorative element.

According to a third aspect there is provided a mobile device, for example a mobile computer device (such as a smart phone or tablet PC), which comprises a light-emitting element of the type presented herein. The element can be integrated into a casing of the mobile device. A power source of the mobile device can supply the device of the element, in particular the light source thereof, with power.

According to a fourth aspect there is provided a motor vehicle which comprises a light-emitting element of the type presented herein. The element can represent a logo or part of a logo of the manufacturer of the motor vehicle.

According to a fifth aspect there is provided the use of a cover of the type described herein for a light-emitting element, the cover comprising a reflective polarizer and a circular polarizer.

BRIEF DESCRIPTION OF THE DRAWINGS

Further advantages, details and features of the solution described herein will become apparent from the following description of exemplary embodiments and from the figures, in which.

DETAILED DESCRIPTION

Figure 1:
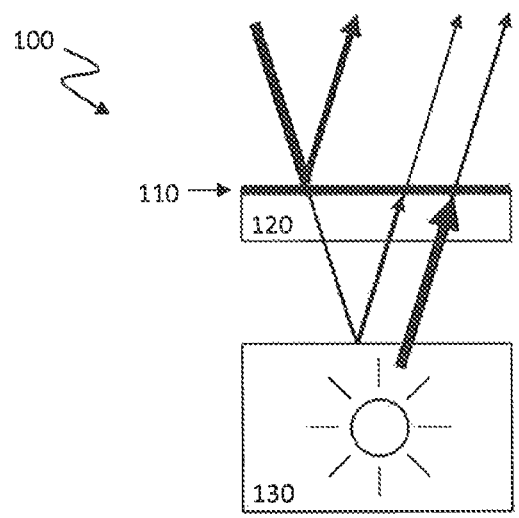
FIG. 1 shows a comparison example of a device having a partially reflective metal surface.

FIG. 1 shows a comparison example of a device 100 having a partially reflective cover. As well as comprising a metal layer 110, the device 100 shown in FIG. 1 comprises a transparent carrier layer 120, in front of the front face of which there is arranged the metal layer 110, as well as a light source 130 arranged behind the carrier layer 120.

The thickness of the metal layer 110 is so chosen that light which strikes the metal layer 110 is partly reflected by and partly transmitted through the metal layer 110. Processes of vacuum metallization, for example, are suitable for applying the metal layer 110 to the carrier layer 120.

As is shown by the left-hand arrow in FIG. 1, the partially reflective property of the metal layer 110 has the effect that incident ambient light is reflected into the surrounding area again to a certain extent. At the same time, light that is emitted by the light source 130, as is shown by the right-hand arrow, is transmitted through the metal layer 110 to a certain extent and can thus likewise be perceived from the surrounding area of the device 100. Because the metal layer 110 is partially transparent, some of the incident ambient light is additionally able to penetrate into the device and also leave it again, which is shown in the drawing by the middle arrow. In particular when the illumination is switched off and in strong ambient light, this can result in the inside of the device being visible in an undesirable manner.

The device 100 shown in FIG. 1 is suitable for use as a decorative mirror element. For such a use of the device 100, it is desirable that both the reflectivity of the metal surface for ambient light and the transmissivity of the metal surface for light generated by the light source 130 are high. However, the two properties, that is to say reflectivity and transmissivity of the metal layer 110, behave reciprocally to one another in dependence on the thickness of the metal layer 110. This means that a variation of the thickness of the metal layer in favour of one of the two properties adversely affects the other property. Absorption losses in the case of emitted light in the metal layer 110 and the penetration of ambient light into the device must therefore be so adjusted, by a suitable choice of the thickness of the metal layer, that both the energy losses on operation of the light source 130 and the aesthetic disadvantages caused by ambient light entering the device 100 and passing out of it again are acceptable. A disadvantage of many metal layers for the described purpose is the generally relatively high absorption of light by metallic surfaces.

Figure 2:
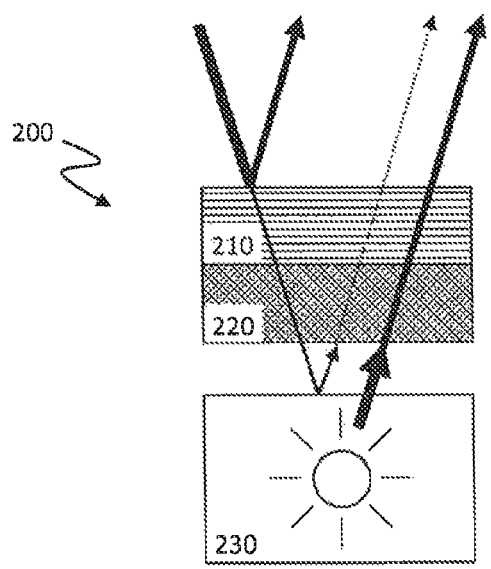
FIGS. 2 and 3 show schematic representations of different exemplary embodiments of a device having a partially reflective surface of the type presented herein.

FIG. 2 shows an exemplary embodiment of a device 200 as is suitable, for example, for use as a decorative mirror element. The device 200 comprises a cover, which comprises a reflective polarizer 210 and a circular polarizer 220, and a light source 230 arranged behind the cover.

The reflective polarizer 210 is in the form of a dielectric multi-layer mirror. As compared with the metal layer 110 used in FIG. 1, a dielectric multi-layer mirror has the advantage that losses of brightness by absorption are substantially lower both for reflected and for transmitted light than in the case of a metal layer. This means in particular that, with the same reflectivity, a larger part of the light emitted by the light source 230 is able to pass through the cover into the surrounding area of the device 200. In addition, a suitable choice of the material and of the layer thicknesses within the dielectric multi-layer mirror means that a high transmissivity can be achieved for light of specific wavelengths and polarization properties, while at the same time non-polarized white light is predominantly reflected. Thus, for example, more than 40% or more than 50% and optionally up to 60% or up to 70% of incident white light can be reflected.

The device 200 shown in FIG. 2 further comprises a circular polarizer 220, which is arranged behind the dielectric multi-layer mirror 210. In one exemplary embodiment, the circular polarizer 220 comprises a linear polarizer layer and one or more retarder layers (e.g., a quarter-wave layer and an optional half-wave layer). The retarder layers can be adhesively bonded to one another by layers of adhesive, PSA (pressure-sensitive adhesive), for example with thicknesses of from 3 to 20 micrometres. According to one variant, the circular polarizer 220 has the purpose, inter alia, of preventing ambient light which has passed through the dielectric multi-layer mirror and is reflected inside the device 200 from leaving the device 200 again.

The effect of the modifications in the device 200 of FIG. 2 as compared with the device 100 of FIG. 1 is illustrated by the arrows, which represent incident, reflected and also emitted light. It will be seen that, in FIG. 2, both the proportion of reflected ambient light and the proportion of transmitted generated light are increased as compared with the situation in FIG. 1. At the same time, the proportion of ambient light that has entered the device 200 and passed out of it again is substantially smaller than in the case of the partially reflective metal layer 110 of FIG. 1.

The transmission of light generated by the light source 230 through the cover 210, 220 is increased when the emitted light is polarized and the polarization of the emitted light and the circular polarizer 220 are so matched to one another that the proportion of the generated light that passes through the polarizer 220 is maximised. Moreover, the dielectric multi-layer mirror 210 can also be so constituted and configured that it has high transmissivity for that light. One or more light-emitting diodes are generally suitable as the light source 230. The use of an optional liquid crystal display between the light source 230 and the circular polarizer 220 offers additional advantages. It allows the light emitted by the device 200 to be varied locally in terms of colour and/or a diaphragm function for emitted light to be provided.

Figure 3:
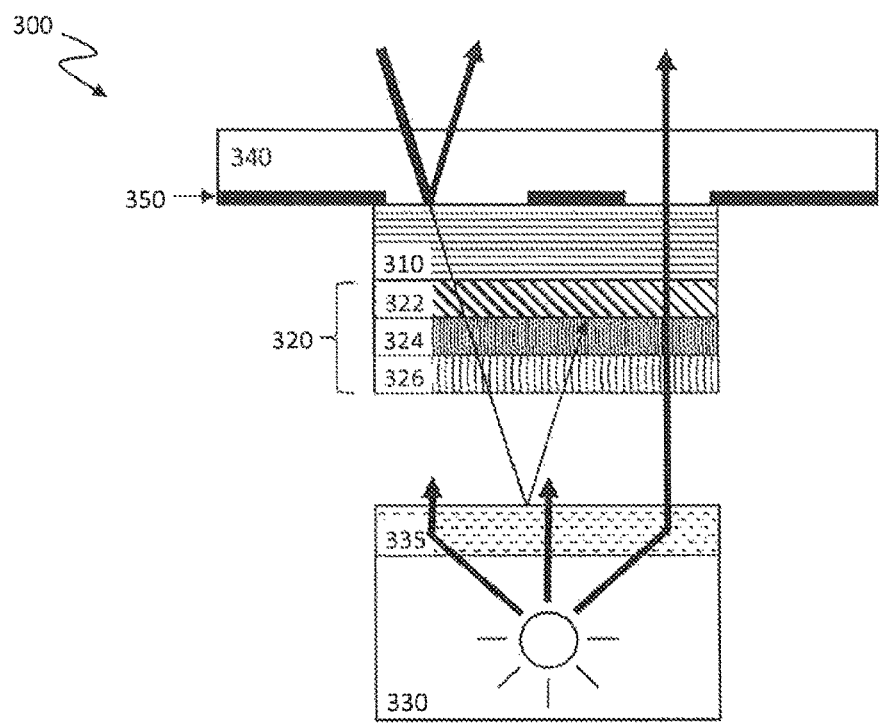

FIG. 3 shows a further exemplary embodiment of a device 300 having a partially reflective cover. The device 300 also comprises a reflective polarizer 310 and a circular polarizer 320, the circular polarizer 320 in this case comprising a linear polarizer 322, an optional half-wave layer 324 for a reference wavelength in the visible wavelength range, and a quarter-wave layer 326 for a reference wavelength in the visible wavelength range. The device 300 additionally comprises a light source 330, on the front face of which there is arranged a light guide layer 335, a transparent covering layer 340, which is arranged in front of the reflective polarizer 310, and a non-transparent or weakly transparent diaphragm 350, which partially covers a front face of the reflective polarizer 310.

The use of the optional half-wave layer 324 in the circular polarizer 320 serves to compensate or at least reduce undesirable phase shifts in the case of light which does not correspond to the reference wavelength of the quarter-wave layer 326. This results in more homogeneous polarization over a broader light spectrum, whereby an improved filter action of the circular polarizer is achieved in particular. This is shown in FIG. 3 by the fact that all the reflected ambient light is absorbed inside the device by the circular polarizer 320.

The arrows shown in FIG. 3 additionally indicate that the transmission of emitted light, in particular when it is circularly polarized, is also increased further as compared with the device 200 of FIG. 2. This is likewise an effect of the half-wave layer 324, which improves the polarization properties for the circularly polarized light emitted by the light source 330 in that a higher transmission is achieved both through the linear polarizer 322 and through the reflective polarizer 310.

Compared with the device 200 shown in FIG. 2, the exemplary embodiment shown in FIG. 3 additionally comprises a light guide layer 335, which is arranged above the light source 330. The purpose of the light guide layer 335 is to homogenise the light emitted by the light source 330 over the surface, as a result of which a more uniform brightness of the emitted light at the surface of the device 300 is achieved. In other exemplary embodiments, the light guide layer 335 could be used purposively to guide light emitted by the light source 330 to the layer sequence shown in FIG. 3 or the layer sequence of FIG. 2. The light source 330 could therefore be arranged offset with respect to the optical axis of the corresponding layer sequence or further away from the corresponding layer sequence.

In FIGS. 2 and 3, the circular polarizer 220, 320 is in each case arranged separated from components 230, 335 of the device 200, 300 that are arranged behind it by a gap. In alternative embodiments, however, the circular polarizer 220, 320 can also be adhesively bonded to a component located behind it.

The device 300 according to FIG. 3 further comprises a transparent rigid covering layer 340, which serves especially to protect the reflective polarizer 310 and further components of the device 300. When the device 300 is used as a decorative element, the rigid covering layer additionally offers design possibilities, such as, for example, by colouring or structuring the covering layer. Suitable materials for the rigid covering layer are in particular glass, polyethylene terephthalate, PET, polymethyl methacrylate, PMMA, and transparent plastics.

The non-transparent or weakly transparent diaphragm 350 covers at least part of the reflective polarizer 310. The use of the diaphragm 350 in particular permits a simple design of the appearance of the device 300, which would not be possible on other components of the device or would be possible only with a considerably higher outlay. The remaining components of the device can thus be produced in simple geometric shapes, for example with a rectangular cross-sectional profile, while the diaphragm 350 can have complex cutouts which correspond to graphic structures such as symbols, logos or lettering.

It will be appreciated that the rigid covering layer 340 and/or the diaphragm 350 could also be used in other exemplary embodiments. Reference is made in this connection to the exemplary embodiment according to FIG. 2. In addition, when a liquid crystal display is used in front of or as part of the light source 330, the liquid crystal display can also function as a diaphragm. It can further be controlled electrically so that, for example, lettering can be displayed by the device 300.

In some examples of the device 200, 300 of FIGS. 2 and 3, the light source 220, 330 comprises one or more organic light-emitting diodes (OLED), for example, an OLED film that is arranged behind the circular polarizer 220, 320. In some examples, the OLED film provides diffuse and monochromatic light. In addition, in some instances, the OLED film is adhesively bonded, for example, laminated, to the circular polarizer 220, 320 in front of it. In other instances the OLED film is arranged separated from the circular polarizer 220, 320. In some examples the OLED film matches in size the surface of the circular polarizer 220, 320.

Using an OLED film as light source 220, 320 can be particularly advantageous in cases where a low overall height of the device 200, 300 is desired. Aside from the comparatively low thickness of OLEDs themselves, an OLED film can emit homogeneous light over a larger area and can also be adapted to a curved or uneven surface. An additional light guide layer 335 for homogenization of the emitted light can therefore be dispensed with. Moreover, OLEDs have a high energy conversion efficiency, which makes them particularly suited for use in battery driven devices.

Figure 4:
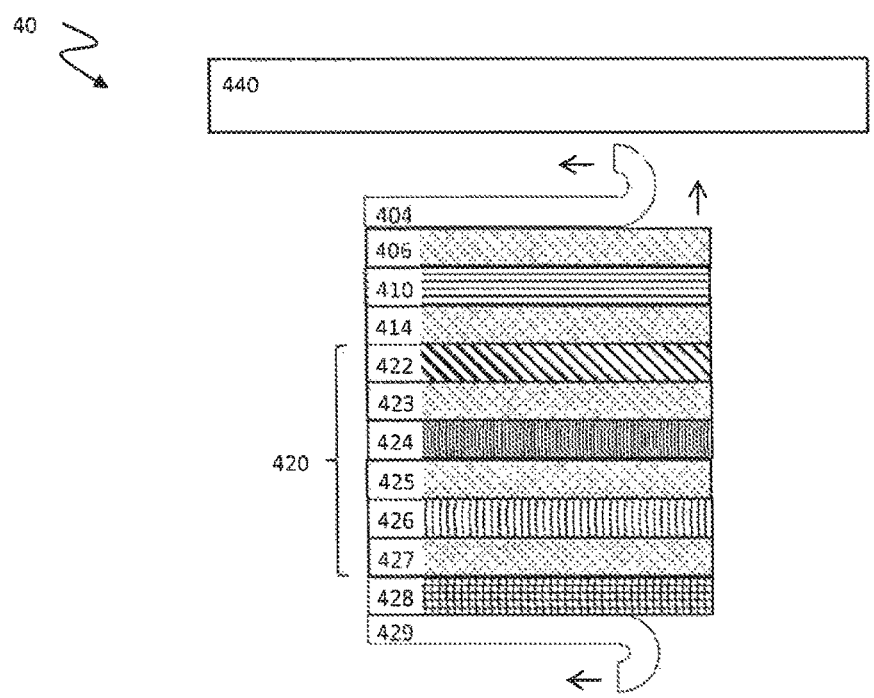
FIG. 4 shows a schematic representation of an exemplary embodiment of a partially reflective cover of the type presented herein.

FIG. 4 shows an exemplary embodiment of a partially reflective cover 400. As well as comprising a rigid covering layer 440, the cover 400 comprises a separating film 404, a first adhesive layer 406, a reflective polarizer 410, a second adhesive layer 414, a linear polarizer 422, a third adhesive layer 423, an optional half-wave layer 424, a fourth adhesive layer 425, a quarter-wave layer 426, a fifth adhesive layer 427, a protective layer 428 and a removable protective film 429. The layers 422, 423, 424, 425, 426, 427 from the linear polarizer 422 to the fifth adhesive layer 427 form a circular polarizer 420.

In the example shown, all the adhesive layers 406, 414, 423, 425, 427 consist of PSA. The protective layer 428 can comprise a hardcoating, for example of triacetyl cellulose, TAC.

As is shown in FIG. 4, the layer structure for the reflective polarizer 406, 410, 414 and the circular polarizer 420 can be pre-fabricated as a separate assembly group and bonded in a further working step, for example, to the rigid covering layer 440. It is advantageous if, for better handling, such an assembly group is provided with separating or protective films 404, 429, which can be removed immediately prior to further processing. In another example, the pre-fabricated layer structure further comprises an OLED film (not shown) arranged behind the circular polarizer 420.

Figure 5:
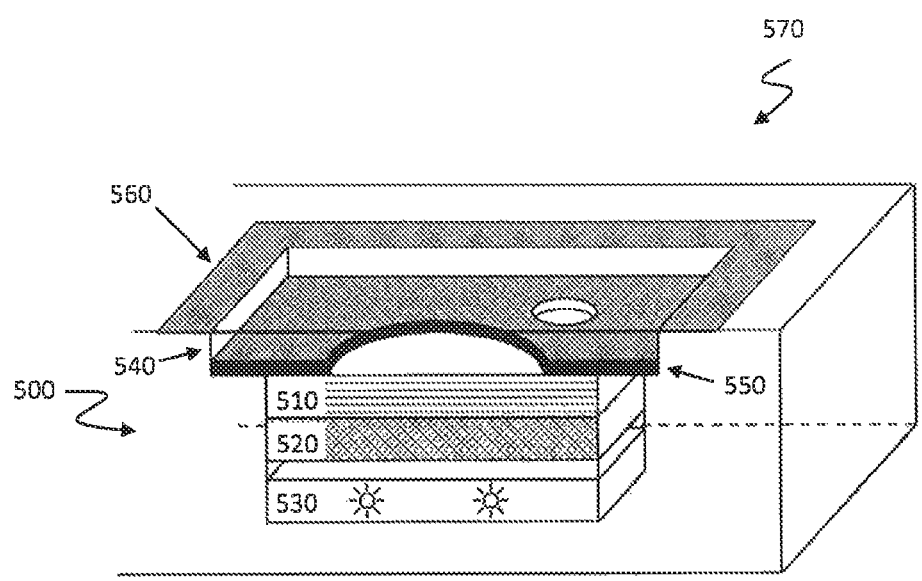
FIG. 5 shows a schematic representation of an exemplary embodiment of a mobile device having a decorative element which comprises a device having a partially reflective surface.

FIG. 5 shows a section of an exemplary embodiment of a mobile device 570, for example a mobile computer device, which has a decorative element 560 into which there is in turn integrated a device 500 of the type presented herein. The device 500 shown comprises a reflective polarizer 510, a circular polarizer 520, a light source 530 separated from the circular polarizer by a gap, a transparent rigid covering layer 540 and a diaphragm 550, which partially covers the front face of the reflective polarizer 510. It will be appreciated that the layer sequence of FIG. 5 can also be used for fields of use other than mobile devices, for example for fitting into the interior of a motor vehicle.

In FIG. 5 it is shown schematically that the light source 530 can be in planar form and have a plurality of individual light sources. In addition, the perspective view makes it clear how any desired shapes of an illuminated mirror surface can be produced by a suitable configuration of the diaphragm 550.

The decorative element is integrated into a casing surface of the mobile device 570, while the power supply to the light source 530 can be ensured, for example, by a power source of the mobile device 570. The mobile device 570 can in particular additionally be a portable computer device, a portable communications device or a motor vehicle accessory.

In addition to the uses described above, the device presented herein can also be used in a motor vehicle as a rear-view mirror and/or cosmetic mirror (or as part thereof).

In particular when used in a motor vehicle or a motor vehicle accessory, it is additionally advantageous if the device described herein is heat- and moisture-resistant. For example, the components of the device may exhibit no significant impairment in terms of their device and their optical and mechanical properties after at least five hundred hours' continuous exposure to an ambient temperature of 60° C. at a relative humidity of between 92% and 95%, or after at least five hundred hours' continuous exposure to an ambient temperature of 95° C.

The exemplary embodiments of devices shown in FIGS. 2 to 5 differ from one another in a plurality of features. These features can be used in any desired combination in further embodiments of the device presented herein. In addition, the described devices can naturally also be used in applications other than in mobile devices, for example in the interior design sector.

What is claimed is:

1. Device having a partially reflective cover comprising:
a light source; and
a cover which is arranged in front of the light source, the cover being exposed to incident non-polarized ambient light,
wherein the cover comprises a reflective polarizer and a circular polarizer, the reflective polarizer being arranged on a side of the cover exposed to the incident non-polarized ambient light, and the circular polarizer being arranged behind the reflective polarizer on an opposite side of the cover on which light of the light source falls, and
wherein the reflective polarizer comprises a dielectric multi-layer mirror that predominately reflects the incident non-polarized ambient light in the visible wavelength range that falls on the reflective polarizer and has high transmissivity for light of at least one visible wavelength emitted by the light source and polarized by the circular polarizer.

2. Device according to claim 1, wherein the circular polarizer comprises a linear polarizer and a quarter-wave layer.

3. Device according to claim 1, wherein the cover further comprises a half-wave layer.

4. Device according to claim 3, wherein the half-wave layer is part of the circular polarizer.

5. Device according to claim 1, wherein the light source comprises a light-emitting diode.

6. Device according to claim 1, wherein the light source comprises an organic light-emitting diode-, OLED-, film.

7. Device according to claim 1, wherein the device further comprises a liquid crystal display which is arranged in front of the light source, and wherein the light of the light source that is transmitted by the liquid crystal display is polarized.

8. Device according to claim 1, wherein a light guide is arranged on a front face of the light source.

9. Device according to claim 8, wherein the light guide is configured to homogenise the light emitted by the light source over the surface.

10. Device according to claim 1, wherein the light source emits polarized light, and wherein the polarization of the emitted light and the circular polarizer of the device are so matched to one another that high transmission of the emitted light through the circular polarizer takes place.

11. Device according to claim 10, wherein the reflective polarizer is transparent to light that is emitted by the light source and transmitted by the circular polarizer.

12. Device according to claim 1, further comprising a transparent covering layer which is arranged in front of the reflective polarizer.

13. Device according to claim 1, further comprising a non-transparent diaphragm, wherein the non-transparent diaphragm is arranged in front of the reflective polarizer, and wherein the non-transparent diaphragm partially covers a front face of the reflective polarizer.

14. Device according to claim 13, wherein the diaphragm is so configured that part of the front face of the reflective polarizer that is covered or not covered by the diaphragm has the form of a logo.

15. Light-emitting element, in particular decorative element, comprising a device according to claim 1.

16. Mobile device comprising a light-emitting element according to claim 15.

17. Motor vehicle comprising a light-emitting element according to claim 15.

18. Method of using a cover, wherein the cover is exposed to incident non-polarized ambient light and comprises a reflective polarizer and a circular polarizer; comprising:

arranging the cover in front of a light-emitting element; and emitting light from the light-emitting element through the cover, wherein the reflective polarizer is arranged on a side of the cover exposed to the incident non-polarized ambient light, and the circular polarizer is arranged behind the reflective polarizer on an opposite side of the cover on which the light emitted by the light-emitting element falls, wherein the reflective polarizer comprises a dielectric multi-layer mirror that predominately reflects the incident non-polarized ambient light in the visible wavelength range that falls on the reflective polarizer and has high transmissivity for light of at least one visible wavelength emitted by the light-emitting element and polarized by the circular polarizer.

* * * * *